(12) United States Patent
Black

(10) Patent No.: US 10,339,519 B2
(45) Date of Patent: Jul. 2, 2019

(54) VISUAL ACCESS TOKEN

(75) Inventor: Jonathan S. Black, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 12/955,516

(22) Filed: Nov. 29, 2010

(65) Prior Publication Data
US 2012/0132704 A1 May 31, 2012

(51) Int. Cl.
*G06Q 20/32* (2012.01)
*G06F 21/33* (2013.01)
*G06F 21/62* (2013.01)

(52) U.S. Cl.
CPC ....... *G06Q 20/3274* (2013.01); *G06F 21/335* (2013.01); *G06F 21/6245* (2013.01)

(58) Field of Classification Search
CPC .................................... G06Q 20/1235
USPC ........................................... 705/50
See application file for complete search history.

(56) References Cited

U.S. PATENT DOCUMENTS

| | | | | |
|---|---|---|---|---|
| 7,810,720 B2* | 10/2010 | Lovett | | 235/380 |
| 9,697,507 B2* | 7/2017 | Mariotti | | G06Q 20/20 |
| 2002/0008145 A1* | 1/2002 | Walsh et al. | | 235/462.46 |
| 2002/0104027 A1* | 8/2002 | Skerpac | | G07C 9/00158 726/28 |
| 2002/0174177 A1* | 11/2002 | Miesen | | H04M 3/4281 709/203 |
| 2007/0162961 A1* | 7/2007 | Tarrance | | G06F 21/33 726/5 |
| 2007/0185718 A1* | 8/2007 | Di Mambro | | G06F 21/32 704/273 |
| 2007/0256124 A1* | 11/2007 | Ih | | G06F 21/335 726/9 |
| 2009/0022314 A1* | 1/2009 | Wada et al. | | 380/246 |
| 2009/0325640 A1* | 12/2009 | Chava | | 455/556.1 |
| 2010/0262543 A1* | 10/2010 | Shin et al. | | 705/44 |
| 2010/0299731 A1* | 11/2010 | Atkinson | | G06F 21/42 726/6 |
| 2010/0315200 A1* | 12/2010 | Warrier | | 340/5.51 |
| 2011/0093261 A1* | 4/2011 | Angott | | G10L 15/10 704/205 |
| 2011/0210171 A1* | 9/2011 | Brown et al. | | 235/382 |
| 2011/0226850 A1* | 9/2011 | Ungos et al. | | 235/375 |
| 2011/0289537 A1* | 11/2011 | Buehl | | H04N 21/4223 725/98 |
| 2012/0089471 A1* | 4/2012 | Comparelli | | 705/18 |
| 2013/0132091 A1* | 5/2013 | Skerpac | | G10L 17/005 704/273 |

* cited by examiner

*Primary Examiner* — Chinedu C Agwumezie
(74) *Attorney, Agent, or Firm* — Schwegman, Lundberg & Woessner

(57) ABSTRACT

A method of creating a visual access token is described. The method comprises: receiving an input referencing private information without revealing the private information; retrieving the referenced private information using the referencing input; encoding the retrieved private information as part of a visual image for use as a visual access token; and presenting the visual access token on a display of a portable communication device for machine reading.

13 Claims, 3 Drawing Sheets

Social networking login details

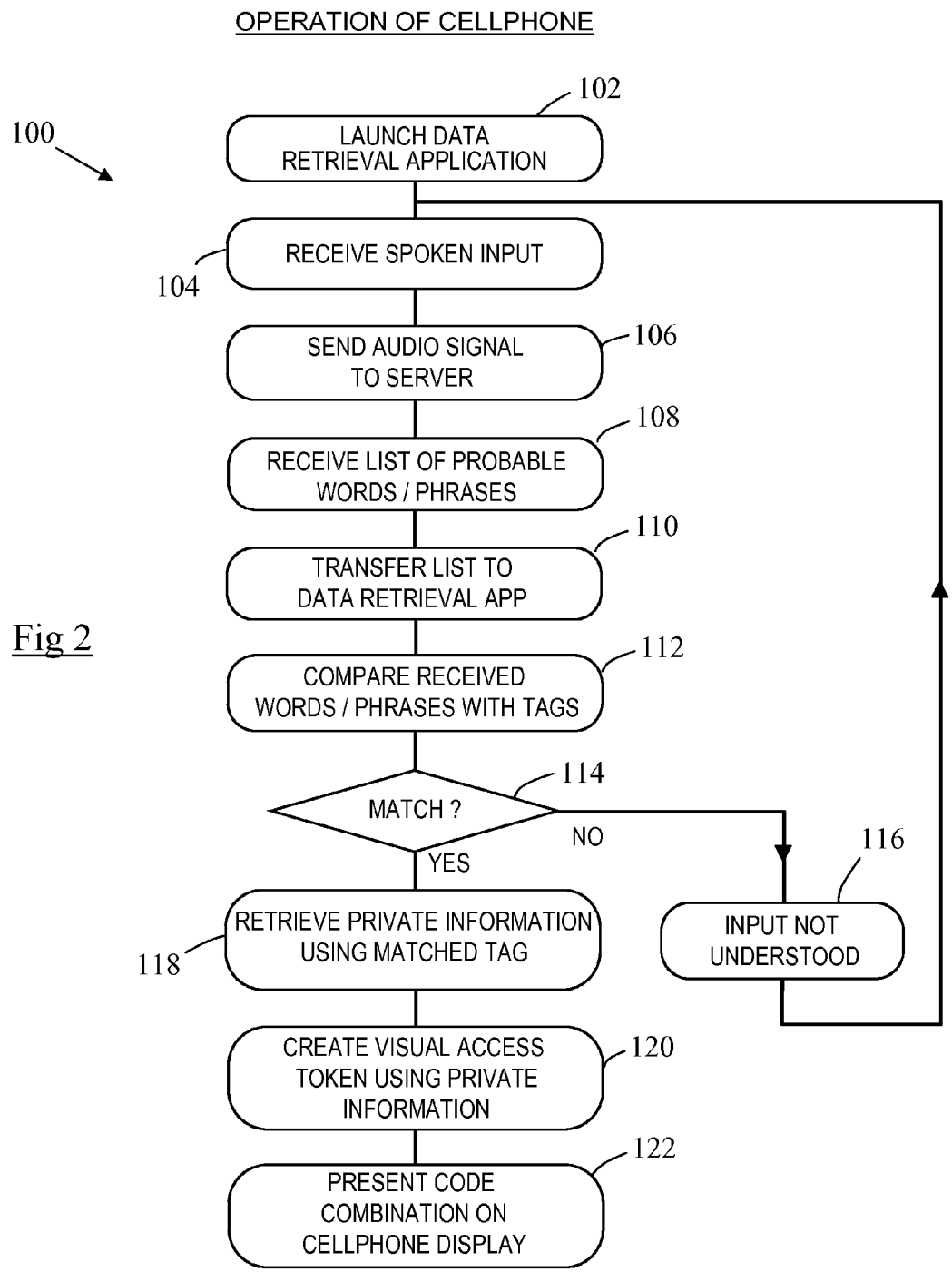

VISUAL ACCESS TOKEN

FIELD OF INVENTION

The present invention relates to improvements in or relating to creating a visual access token.

BACKGROUND OF INVENTION

A visual access token, such as a two-dimensional (2D) barcode, provides optically-readable data to a system that includes an image reader, so that a user presenting the visual access token can access functions or information provided by that system. The system allows the user to access the system based on the data extracted from the visual access token by the image reader. For example, a 2D barcode may encode a Web site Uniform Resource Locator (URL) and some transaction data. The 2D barcode may be presented to a computer having a 2D barcode reader, so that the computer accesses the encoded Web site and provides the transaction data to that Web site automatically as a result of reading the 2D barcode.

It would be desirable to be able to create a visual access token that includes private information, since this would be needed to access some Web sites or other resources (such as self-service terminals (SSTs)). Such private information could be encrypted within the visual access token to prevent third parties from extracting this private information. However, it may not be desirable to enter the private information if the user is in a public location, particularly if voice input is being used to enter the private information. This is because a passer-by or some other third party may overhear the private information. Even if a user entered the private information using keystrokes on a menu-based graphical user interface (GUI), there would still be the possibility of someone else "shoulder surfing" the user to observe the private information.

SUMMARY OF INVENTION

Accordingly, the invention generally provides methods, systems, apparatus, and software for creating a visual access token that includes private information without having to enter that information directly.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of creating a visual access token, the method comprising:

receiving an input referencing private information without revealing the private information;

retrieving the referenced private information using the referencing input;

encoding the retrieved private information as part of a visual image for use as a visual access token; and presenting the visual access token on a display of a portable communication device for machine reading.

Receiving an input referencing private information without revealing the private information may include receiving a spoken input via a microphone associated with the portable communication device. Where the input is received via the microphone, voice to text software may be provided (locally or remotely) to create a text input from the spoken input. The text input may correspond to private information tagged with that text input.

Alternatively, receiving an input referencing private information without revealing the private information may include receiving one or more keystrokes entered by a user on a keyboard. The keystrokes may select or correspond to a tag associated with the private information. The keyboard may comprise either a touch sensitive panel in registration with the display or physical keys.

The input may be in the form of an instruction or a word or phrase that the user has associated with private information.

Retrieving the referenced private information may include retrieving encrypted private information.

Retrieving the referenced private information may include retrieving encrypted private information and then decrypting the encrypted private information prior to encoding the private information. This may be less desirable if the visual image is in the form of a standard symbology as third parties would be able to decode the visual image. However, this may be used in embodiments where a custom symbology is provided because third parties would not be able (or not easily able) to decode the symbology.

Encoding the retrieved private information as part of a visual image for use as a visual access token may include using a conventional symbology to encode the retrieved private information. The conventional symbology may comprise a two-dimensional (2D) barcode symbology, such as a QR code (trade mark), a Data matrix code, or the like.

The method may include the further step of encoding transaction information as part of the visual image, so that the visual image includes private information (such as identification information) and transaction information.

According to a second aspect there is provided a portable communication device programmed to implement the method of the first aspect.

The portable communication device may further comprise secure storage in which the private information is stored.

The secure storage may be configured to respond only to a request from a program executed by the portable communication device.

The private information may be protected by encryption.

By virtue of this aspect, a portable communication device is operable to create a visual access token that includes private information without the user having to enter that private information when the visual access token is being created. This enables a user to enter private information once, when the user is located in a private environment. Thereafter, the user can reference the private information for use in creating a visual access token, without having to disclose the content of the private information.

According to a third aspect there is provided a self-service terminal operable to read a visual access token displayed on a portable communication device, the self-service terminal comprising:

an optical imager operable to read a visual access token on a display of a portable communication device; and a processor programmed to: (i) decode the read visual access token, (ii) extract private information from the decoded visual access token, and (iii) access an electronic resource using the extracted private information.

The processor may be further programmed to (iv) request a user of the portable communication device to enter additional information to validate that user's identity.

The processor may be programmed to (v) extract transaction information from the decoded visual access token, and (vi) execute a transaction based on the extracted private information and the extracted transaction information.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

By virtue of this aspect, a terminal can provide a user with access to an electronic resource (such as a Web site, a transaction authorization server, or the like) based on information extracted from a visual access token presented by the user. In addition to granting access to the electronic resource, the terminal may provide physical fulfillment (for example, dispensing of media) as a consequence of the electronic access.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

BRIEF DESCRIPTION OF THE DRAWINGS

FIG. 2 is a flowchart illustrating steps performed by the portable communication device of FIG. 1 in creating a visual access token;

DETAILED DESCRIPTION

Figure 1:
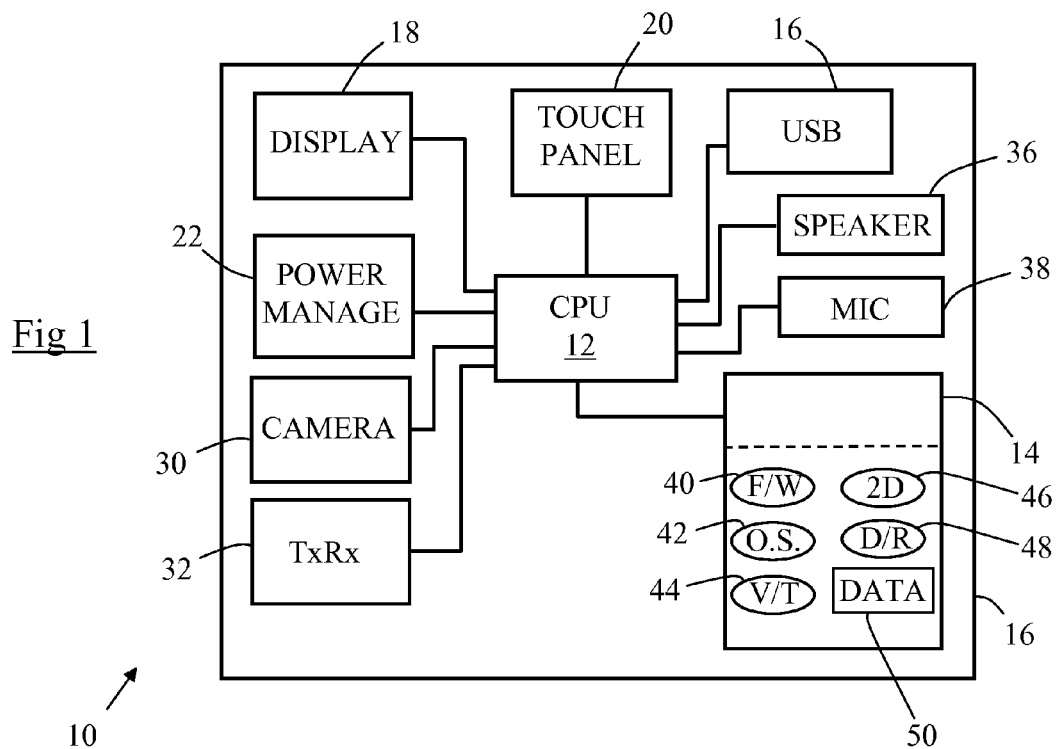
FIG. 1 is a simplified schematic diagram of a portable communication device programmed to create and display a visual access token in accordance with one embodiment of the present invention.

Reference is first made to FIG. 1, which is a simplified schematic diagram of a portable communication device 10, in the form of a cellular radiofrequency telephone (referred to hereinafter as a "cellphone") programmed to create and display a visual access token in accordance with one embodiment of the present invention. In this embodiment the cellphone is a Samsung Galaxy S (trade mark) handheld telephone executing the Android 2.1 (trade mark) operating system.

The cellphone 10 comprises one or more processors 12, non-volatile memory 14 (including removable and fixed secure digital memory cards), a data communications interface 16 (including a USB port), a display 18 and associated touch sensitive panel 20, a power management circuit 22 (including a battery, recharging circuitry, and a connection for a DC power supply), a camera 30, a cellular transceiver 32 (including an antenna), a loudspeaker 36, and a microphone 38. All of these components are conventional cellphone components.

The cellphone 10 includes firmware 40 (labeled "F/W" in FIG. 1) in non-volatile memory 14 for controlling the abovementioned components (such as the display 18, the touch sensitive panel 20, the camera 30, and the like).

The cellphone 10 also includes an operating system 42 (labeled "O.S." in FIG. 1), in the form of Android 2.1 (trade mark), and additional functional applications. Many of these functional applications provide functions that are not relevant to this embodiment, so will not be described herein.

One of the functional applications that is relevant to this embodiment is a voice recognition application 44 (labeled "V/T" in FIG. 1) provided by Google Inc. (trade mark) for the Android operating system and referred to as Android Speech Recognition.

Another functional application used in this embodiment is a barcode scanning and encoding application 46 (labeled "2D" in FIG. 1). This barcode application 46 is based on an open-source, multi-format 1D/2D barcode image processing library provided by Zxing (see http://code.google.com/p/zxing/ for more details).

Another functional application used in this embodiment is a data retrieval application 48 (labeled "D/R" in FIG. 1). This data retrieval application 48 allows a user to reference and retrieve private information indirectly (that is, without divulging the private information), as will be described in more detail below.

The cellphone 10 includes a secure data store 50 in the non-volatile memory 14, which only the data retrieval application 48 can access.

The secure data store 50 is used to store private information relating to the user, such as login credentials, passwords, and the like.

A user of the cellphone 10 (usually, but not necessarily the owner of the cellphone) can use the data retrieval application 48 to store private information and to tag this private information with a unique word or phrase. For example, in this embodiment, the user has saved login credentials and a URL for a social networking Web site (an electronic resource) in the secure data store 50, and tagged these credentials with the word "Friends". The user has also saved bank account information, including his account number and bank name, but not his personal identification number (PIN), and tagged these credentials with the word "Bank". The user also includes a brief description of each of these tags (referred to herein as a description field). For example, the user describes the "Friends" tag as "Social networking login details" in the description field for the "Friends" tag; and the user describes the "Bank" tag as "Bank account without PIN" in the description field for the "Bank" tag.

Figure 3:
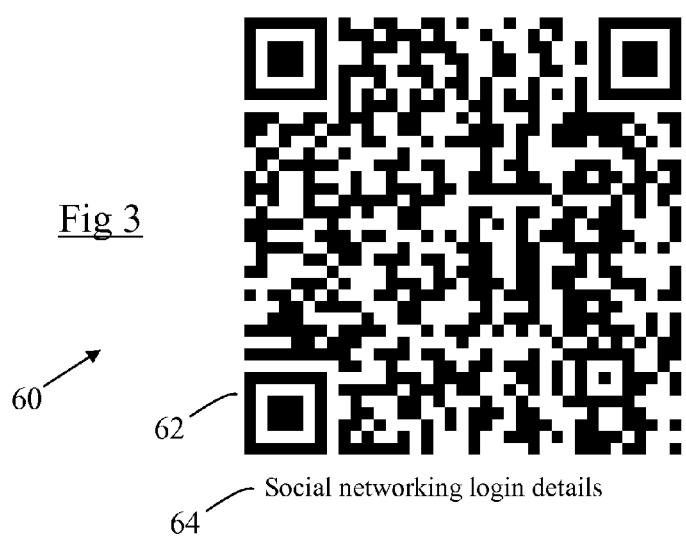
FIG. 3 is a pictorial diagram illustrating a visual access token created by the steps illustrated in FIG. 2 and an accompanying description, as presented on a display of the portable communication device of FIG. 1.

The operation of the cellphone 10 will now be described with reference to FIG. 2, which is a flowchart 100 illustrating steps performed by the cellphone 10 in creating a visual access token using these functional applications 44,46,48. Reference will also be made to FIG. 3, which is a pictorial diagram of a visual access token 62 created by the steps of flowchart 100 and an accompanying description, as presented on a display of the cellphone 10.

Initially, the user of the cellphone 10 launches the data retrieval application 48 (step 102) either by using a keystroke on the touch sensitive panel 20 or by speaking an input into the microphone 38.

Once the data retrieval application 48 is executing, the user then speaks an input into the microphone 38, which the voice recognition application 44 intercepts and receives as an audio signal (step 104). The input corresponds to one of the words used to tag the private information in the secure data store 50. In this example, the input may be Friends or Bank (since these tags have already been assigned by the user).

The voice recognition application 44 then transmits this audio signal to a remote server (not shown) (step 106) via the cellular transceiver 32. The remote server processes this audio signal to recognize the word or words that were spoken by the user. The remote server then returns a list of the most probable words included in the audio signal, which list is received by the voice recognition application 44 (step 108).

The voice recognition application 44 then passes this list of probable words to the data retrieval application 48 (step 110).

The data retrieval application 48 then compares the list of probable words with the assigned tags ("Friends" and "Bank") (step 112) to ascertain if there is a match (step 114).

If there is no match, then the data retrieval application 48 indicates to the user that the spoken input was not understood and may invite the user to repeat the input (step 116).

If there is a match between one of the words on the list of probable words and one of the tags (for example, the "Friends" tag), then the data retrieval application 48 uses the matched tag (that is, "Friends") to access and retrieve private information stored in the secure data store 50 (step 118).

The data retrieval application 48 then passes the retrieved private information to the barcode scanning and encoding application 46, which creates a visual access token (in the form of a QR Code in this embodiment) encoding the retrieved private information (step 120).

The data retrieval application 48 then presents a code combination 60 (FIG. 3) on the display 18 (step 122). The code combination 60 comprises the created visual access token 62 (the QR code) and a text description 64 informing the user about what the visual access token contains. The text description 64 (in this example, "Social networking login details") is retrieved from the description field for the "Friends" tag. The text description 64 provides the user with verification that the data retrieval application 48 has correctly interpreted the spoken input because it informs the user in a human readable manner about the type of information encoded in the visual access token.

Figure 4:
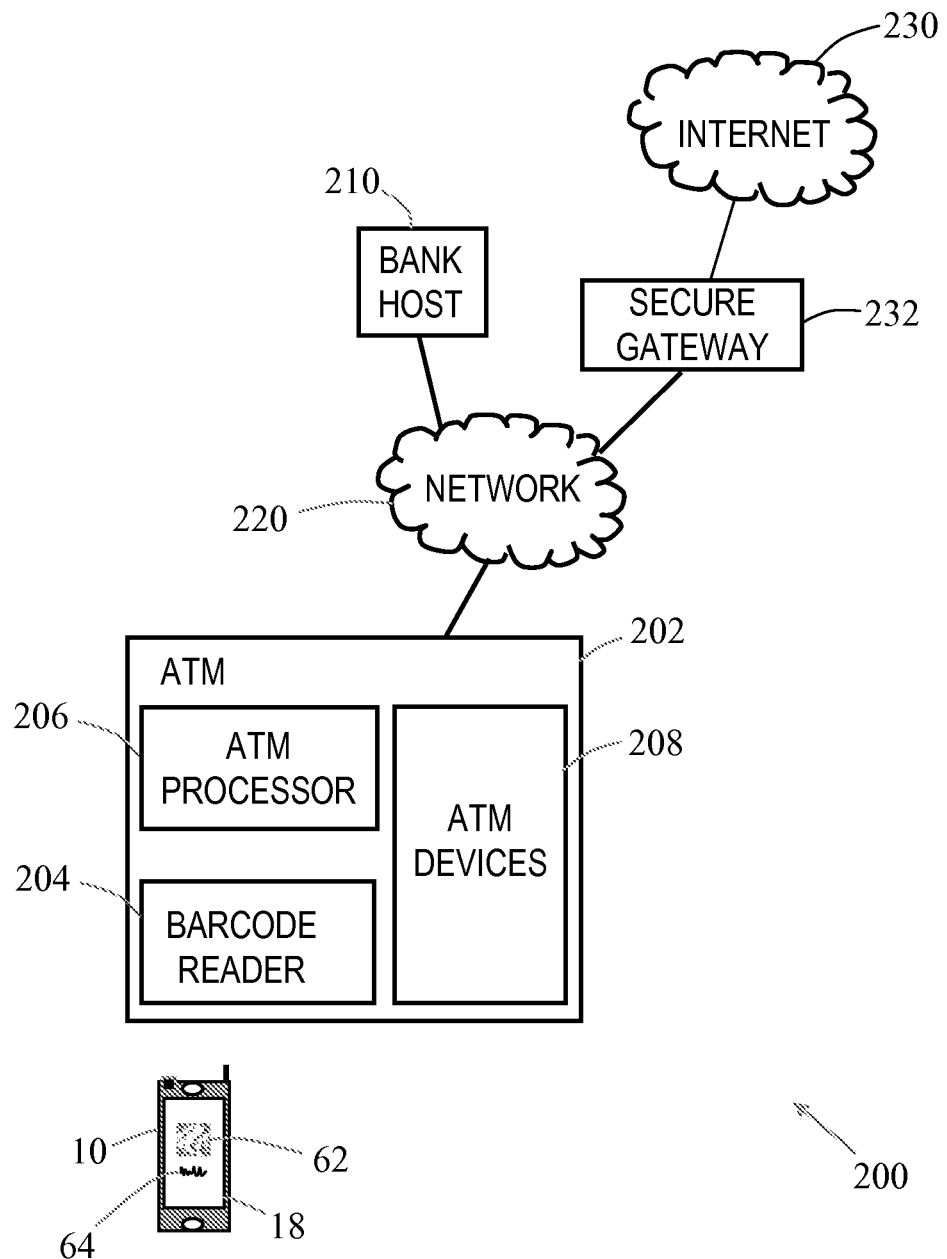
FIG. 4 is a simplified schematic diagram illustrating a system including a networked self-service terminal configured to read the visual access token displayed by the portable communication device of FIG. 1.

The user can then store this visual access token on the cellphone 10 for future use. One example of such a use is when the user wishes to present the visual access token 62 to a system to access an electronic resource, as will be described with reference to FIG. 4, which is a simplified schematic diagram illustrating a system 200 including a networked self-service terminal (in the form of an automated teller machine (ATM)) 202 configured to read the visual access token 62 presented on display 18 of the cellphone 10.

The ATM 202 includes a barcode reader 204 (operable to capture and decode an image of a 1D or 2D barcode), in addition to an ATM processor 206 and various conventional ATM devices 208 (not shown in detail, but including a card reader, a receipt printer, a cash dispenser, and the like).

The ATM 202 is coupled to a financial institution host 210 by a secure network 220 for authorizing transaction requests in the conventional manner.

The ATM 202 can also connect to the Internet 230 via a secure gateway 232 to provide an ATM customer with access to certain Internet Web sites. It is contemplated that the ATM 202 may restrict access to some Web sites, or may only allow access to certain pre-approved Web sites or may retrieve content from a Web site and re-factor that content for presentation to the user, or extract portions of that content for presentation to the user.

When the user desires to access the social networking Web site referenced by the user's private information, then the user requests the data retrieval application 48 to present the code combination 60 on the cellphone display 18.

The user then presents the code combination 60 to the ATM barcode reader 204, which reads the visual access token 62 (the QR code).

The ATM processor 206 then decodes the read visual access token 62, extracts the encoded private information from the decoded visual access token 62, and then uses the extracted private information (the Web site URL and login credentials of the social networking Web site) to access the social networking Web site via the Internet 230, secure gateway 232, and the secure network 220. The ATM processor 206 is then able to present the user's social networking home page on a display of the ATM 202.

In other examples, the user may create an entire transaction that is stored in a visual access token. For example, the user may reference the "Bank" tag to include his/her bank account details, but the user may also enter into the cellphone 10 transaction details such as withdraw twenty dollars from my checking account and request a receipt.

The barcode scanning and encoding application 46 would then create a visual access token that encodes the private bank account information and the transaction details. When the user presents this to the ATM 202 on the display 18 of his/her cellphone 10, the ATM processor 206 decodes this visual access token, then requests the user to enter a PIN (since this is not encoded in the visual access token in this embodiment). If the ATM supports multiple authentication techniques (such as PIN, passbook, pictorial PIN, and the like), then the visual access token may also indicate which authentication method the user prefers to use. The visual access token may also indicate other preferences, such as language, text size on the display, transaction amounts to be displayed, and the like.

The ATM processor 206 would then use the extracted transaction details from the decoded visual access token, the extracted bank account information, and the entered PIN, to execute a transaction for the user.

It should now be appreciated that these embodiments allow a user to create a visual token that includes private information by referencing the private information (using a predefined tag) without having to divulge the private information.

Various modifications may be made to the above described embodiment within the scope of the invention, for example, in other embodiments a different type of cellphone and operating system may be used than those described above.

In other embodiments, the voice recognition application may process audio signals locally instead of sending them to a remote server. Alternatively, the voice recognition application may transmit signals to a remote server using a different communications technology than cellular transmission.

In other embodiments, the user may enter details using keystrokes rather than spoken inputs.

In other embodiments, a different form of visual access token may be used, such as a different 2D barcode symbology, a visual code other than a barcode, or the like.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of creating a visual access token, the method comprising:
   storing, by a portable communication device, private information using credentials of a user within a data store of the portable communication device;
   assigning, by the portable communication device, a tag linked to the private information within the data store;
   launching, by the portable communication device, a retrieval application that executes on the portable communications in response to a spoken input in a microphone of the portable communication device;
   receiving, by the retrieval application, the input via a microphone of the portable communication device comprising the private information;
   maintaining, by the retrieval application, data within the data store corresponding to the received input;
   sending, by the retrieval application, the input to a server;
   receiving, by the retrieval application, words from the input from the server;
   matching, by the retrieval application, the words to to the private information via the tag;
   retrieving, by the retrieval application, the private information from the data store using the matched private information;
   creating, by the retrieval application, a visual access token using the retrieved private information by encoding the retrieved private information as part of a visual image included within the visual access token; and
   presenting, by the retrieval application, the visual access token on a display of the portable communication device.

2. A method according to claim 1, voice to text software is used to create a text input from the input.

3. A method according to claim 2, wherein the text input corresponds to the private information tagged with that text input.

4. A method according to claim 1, wherein receiving further includes receiving one or more keystrokes entered by the user on a keyboard.

5. A method according to claim 1, wherein retrieving further includes retrieving encrypted private information.

6. A method according to claim 5, wherein retrieving further includes retrieving the encrypted private information and then decrypting the encrypted private information prior as the retrieved private information.

7. A method according to claim 1, wherein encoding further includes using a conventional symbology to encode the retrieved private information.

8. A method according to claim 1, wherein the method includes the further step of encoding transaction information as part of the visual image, so that the visual image includes the private information and the transaction information.

9. A method according to claim 1, wherein presenting further includes presenting a description field in the vicinity of the visual access token, where the description field provides a human readable description of the visual access token.

10. A system, comprising:
    a self-service terminal operable to read a visual access token, the self-service terminal comprising:
       an optical imager operable to read the visual access token encoded with private information from a display of a portable communication device, and
    and
    the portable communication device operable to produce the visual access token and present the visual access token on the display, the portable communication device comprising:
       a portable communication device processor; and
       a memory comprising executable instructions that when executed by the processor causes the portable communication device processor to perform the steps of:
       receiving spoken input via a microphone of the portable communication device comprising the private information;
       maintaining data within a data store corresponding to the received input;
       sending the input to a server;
       receiving, by the retrieval application, words from the input from the server;
       matching the words to the private information via a tag;
       retrieving the private information from the data store using the matched private information;
       creating the visual access token using the retrieved private information by encoding the retrieved private information as part of a visual image included within the visual access token; and
       presenting the visual access token on the display of the portable communication device.

11. The system of claim 10, wherein the processor is further programmed to (iv) request the user of the portable communication device to enter additional information to validate that user's identity.

12. The system of claim 10, wherein the processor of the self-service terminal is further programmed to:
    decode the visual access token provided by the optical imager;
    extract the private information from the visual access token;
    extract transaction information from the visual access token; and
    execute a transaction based on the extracted private information and the extracted transaction information.

13. The system of claim 12, wherein the self-service terminal includes a cash dispenser that dispenses cash based on the transaction information.

* * * * *